United States Patent [19]

Maier et al.

[11] Patent Number: 4,667,988
[45] Date of Patent: May 26, 1987

[54] CLAMPING ELEMENT

[75] Inventors: Hans P. Maier, Villingen-Schwenningen; Nikolay Vlaykowski, VS-Schwenningen, both of Fed. Rep. of Germany

[73] Assignee: Agintec AG, Pfaeffikon, Switzerland

[21] Appl. No.: 712,104

[22] Filed: Mar. 15, 1985

[30] Foreign Application Priority Data

Mar. 17, 1984 [DE] Fed. Rep. of Germany ... 8408265[U]

[51] Int. Cl.⁴ .......................................... F16L 19/08
[52] U.S. Cl. .................................. 285/340; 285/368; 285/423
[58] Field of Search .............. 285/340, 368, 902, 423; 411/531, 538, 541, 544

[56] References Cited

U.S. PATENT DOCUMENTS

| | | | |
|---|---|---|---|
| 582,022 | 5/1897 | Nixon | 285/340 |
| 2,202,492 | 5/1940 | Jacocks | 285/340 |
| 2,444,380 | 6/1948 | Shimek | 285/340 |
| 3,204,988 | 9/1965 | Ouderkirk et al. | 285/340 X |
| 3,874,709 | 4/1975 | MacDonald | 285/340 X |
| 4,084,843 | 4/1978 | Gassert | 285/340 X |

FOREIGN PATENT DOCUMENTS

| | | | |
|---|---|---|---|
| 507620 | 5/1953 | Belgium | 285/340 |
| 686128 | 12/1939 | Fed. Rep. of Germany . | |
| 1066065 | 9/1959 | Fed. Rep. of Germany . | |
| 1189798 | 11/1965 | Fed. Rep. of Germany . | |
| 1254913 | 5/1968 | Fed. Rep. of Germany . | |
| 2333686 | 1/1974 | Fed. Rep. of Germany . | |
| 3309969 | 9/1984 | Fed. Rep. of Germany . | |
| 2193437 | 2/1974 | France . | |
| 2309783 | 11/1976 | France | 285/340 |
| 707778 | 6/1966 | Italy | 285/340 |
| 1479499 | 7/1977 | United Kingdom . | |

OTHER PUBLICATIONS

Shatz, "Festklemmen der Gewindeverbindungen", Moskau, Verlag Oborongiz, 1984, p. 104, FIG. 97/3 & p. 109, FIG. 102.
Orlov, "Osnovy Konstruirovania", Moskau, Verlag Mashinostroenie, vol. 2, p. 565, FIG. 533b/5.
P. I. Orlov, "Osnovy Konstruirovania", vol. 2, p. 566, FIG. 534, 1977.
U.S.S.R. Inventor Certificate No. 188,224, (11/24/66).

*Primary Examiner*—Dave W. Arola
*Attorney, Agent, or Firm*—Schwartz, Jeffery, Schwaab, Mack, Blumenthal & Evans

[57] ABSTRACT

Disclosed is a clamping element, in the form of an annular disk, for a pipe coupling between the ends of two butt-joined pipes. Each pipe carries a flange or the like loosely slipped onto its respective end. The flanges may be braced against one another, and each flange is provided with a clamp chamber into which a clamping element placed onto each of the pipe ends fits. The clamping element is held on the end of the pipe by means of an inner, radial clamping edge. A clamping surface of the clamp chamber overlaps the clamping element with respect to an outward, radial clamping edge. The clamping element has such a configuration in the axial direction that an axial compression force applied to the element results in an increase in its external diameter and a decrease in its internal diameter. This results in a seal which surrounds the impact point of the joint. In order to allow the pipe coupling to have a broader field of application, the annular part of the clamping element has an arc-like profile in cross-section. Furthermore, a variety of slots may be arranged in the annular part.

25 Claims, 10 Drawing Figures

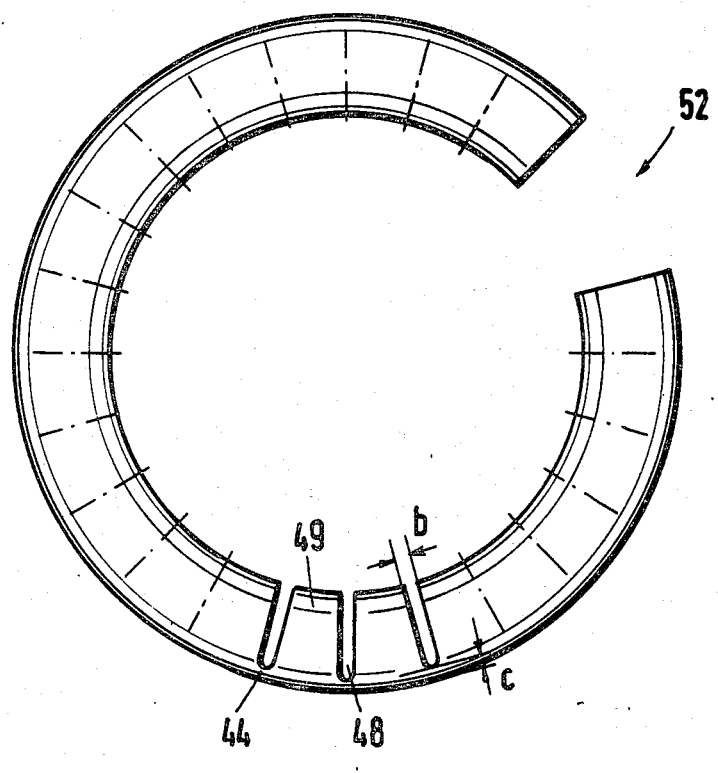

CLAMPING ELEMENT

BACKGROUND OF THE INVENTION

The present invention relates to a clamping element, in the form of an annular disk, for a pipe coupling between the ends of two butt-joined pipes. Each pipe carries a flange or the like loosely slipped onto its respective end. The flanges may be braced against one another, and each flange is provided with a clamp chamber into which a corresponding clamping element fits. The clamping element suppprts itself on the end of the pipe by means of an inner, radial clamping edge. A clamping surface of the clamp chamber overlaps the clamping element with respect to an outer, radial clamping edge. The clamping element has an axial configuration such that an axial compression force applied to the element results in an increase in its external diameter and a decrease in its internal diameter. A seal which surrounds the impact point of the joint is also provided.

A pipe coupling of the above generic type is disclosed in European Application No. 0 087 702. This pipe coupling may be mounted on smooth pipe ends that are merely deburred. Wrenches suitable for the screw joints are the only mounting tools required. The release of the pipe coupling is also very simple. This configuration has been proven in actual practice, especially in sealing against high pressure.

In the known coupling, each clamping element consists of at least one convex disk. The disk may be designed as a flat spring or a toothed, disk-shaped clamping element. The inner, radial clamping edge of each clamping element may be scarfed so as to form a light positive lock between the clamping element and the outer wall of the pipe, in addition to the frictional connection when the joint is tightened.

A comparable pipe coupling may be found in French Pat. No. 2 237 102. In this case, the clamping elements are in the form of relatively narrow clamping rings. The annular section of these rings is inclined at an angle of approximately 30° to the plane of the clamping element. However, experiments have shown that clamping elements with an inclination of this magnitude pass from the elastic into the plastic range when the pipe coupling is tightened, so that proper functioning of the clamping elements is no longer assured after the installation. Furthermore, an inclination of this type requires very large forces to be applied by the screw joints. This necessitates the use of screw joints that are overdimensioned with respect to those used in fields of application of pipe couplings of this type.

Further problems arise in connection with the above-described pipe coupling when the pipes to be joined consist of a brittle material, for example, phenolcontaining resins with fillers. The inner clamping edge pressing into the surface of such pipe occasionally causes the body of the pipe to crack.

SUMMARY OF THE INVENTION

It is therefore an object of the present invention to provide novel clamping elements for the successful and widely used pipe couplings described above and thereby extend the fields of application of such couplings.

This object is attained according to the invention by providing a profile in the annular part of the clamping element. The annular part of the clamping element may thereby have an arc-shaped profile which is preferably determined by a radius and which forms a ring segment of constant thickness.

A clamping element of this type yields a stroke per radius of a curvature that may be calculated as a function of the height of the structure. The stroke may be substantially further increased by placing the arc-shaped profile inclined at an acute angle with respect to the plane of the clamping element. A significantly large stroke may be obtained with a very small structural height in clamping elements of this type. The aforementioned angle of inclination may amount to only 15°, for example.

According to a another embodiment of the present invention, the annular part of the clamping element may comprise an outer annulus of constant width, and a plurality of inwardly-directed tabs which extend from the outer annulus until they are nearly tangential to the inside diameter of the clamping element. The tabs may taper off toward their free ends. These tabs can adapt well to the external diameter of the pipe as a function of the spring characteristic of the material from which the clamping element is made. The spring pressure, which acts on the pipe with a different force depending on the inclination of the slots, may be relatively soft and may thus be adjusted to accomodate brittle or hard pipe materials, such as synthetic plastic pipes, for example. There are further advantages when using softer pipes such as those made of PVC, for example.

The annular part of the clamping element may carry a plurality of tabs on its outer periphery. The tabs may be formed by slots, and extend approximately until they are tangent with the external diameter of the clamping element. It may be advantageous in clamping elements of this type to have an outer radial slot converge with an inner radial slot in the manner of an arrow tip, wherein the outer and inner tabs formed in this manner are connected only in the area of the arrow tip and in the direction of the periphery. Associated slots may include an angle of about 120°. These clamping elements are particularly suitable for very non-circular pipes and for pipes which, because of their internal coating or thin walls, may only be exposed to low mechanical forces. The center link forming the tip of the arrow in the clamping elements may constitute a predetermined fracture location. In each case, the individual angular shanks then form a separate clamping element with a respective spring characteristic. Such clamping elements may further be divided into two halves and using on pipes which are sensitive to mechanical effects even during their installation.

In another embodiment of invention, the annular part of the clamping element may comprise a narrow outer annulus from which inwardly-directed radial tabs are suspended. Clamping elements of this type, which may only have inwardly extending radial slots, require relatively high tightening torques to establish the pipe couplings. The forces acting radially onto the parts of the flange or the chamber are low in such pipe couplings. This is particularly advantageous in the case of chamber of flange parts made of a brittle material, such as aluminum or a synthetic plastic.

In a modified embodiment of the invention, the annular part of the clamping element may comprise both inner radial slots and the outer cutouts arranged between the inner slots. It is advantageous in this case to have the length of the radial slots several times larger than the radial depth of the cutouts. The clamping elements according to this embodiment require lower tightening torques to join the pipes, but the radial forces acting on the chamber or flange parts are substantial, particularly with external pipe diameters in the plus tolerance range. These clamping elements are suitable for flange or chamber parts for ductile materials, such as according to DIN (German Industry Standard) 17100.

Particularly with clamping elements equipped only with inner radial slots, it may be advantageous to cut the annular section at one point. Such clamping elements may be used for enamelled steel pipes, for example, because the enamel is applied around the circumference and thereby increases the diameter of the pipe. If standard clamping elements were to be used, the enamel layer on the outer circumference of the pipe would be damaged. Cut clamping elements may also be used with coated pipes.

Steel of grade CK 75 may be used as a material for the clamping elements. The material is preferably intermediately hardened by heat treatment. Cold rolled strip up to the grade C 95 may also be used.

Further objects, features and advantages of the present invention will become apparent from the detailed description of preferred embodiments which follows, when considered together with the attached figures of drawing.

BRIEF DESCRIPTION OF THE DRAWINGS

In the drawings:

FIG. 7 is a modified embodiment in a view similar to FIGS. 3 and 4;

FIG. 8 is a cross section through a clamping element according to FIG. 7;

DETAILED DESCRIPTION OF PREFERRED EMBODIMENTS

Figure 1:
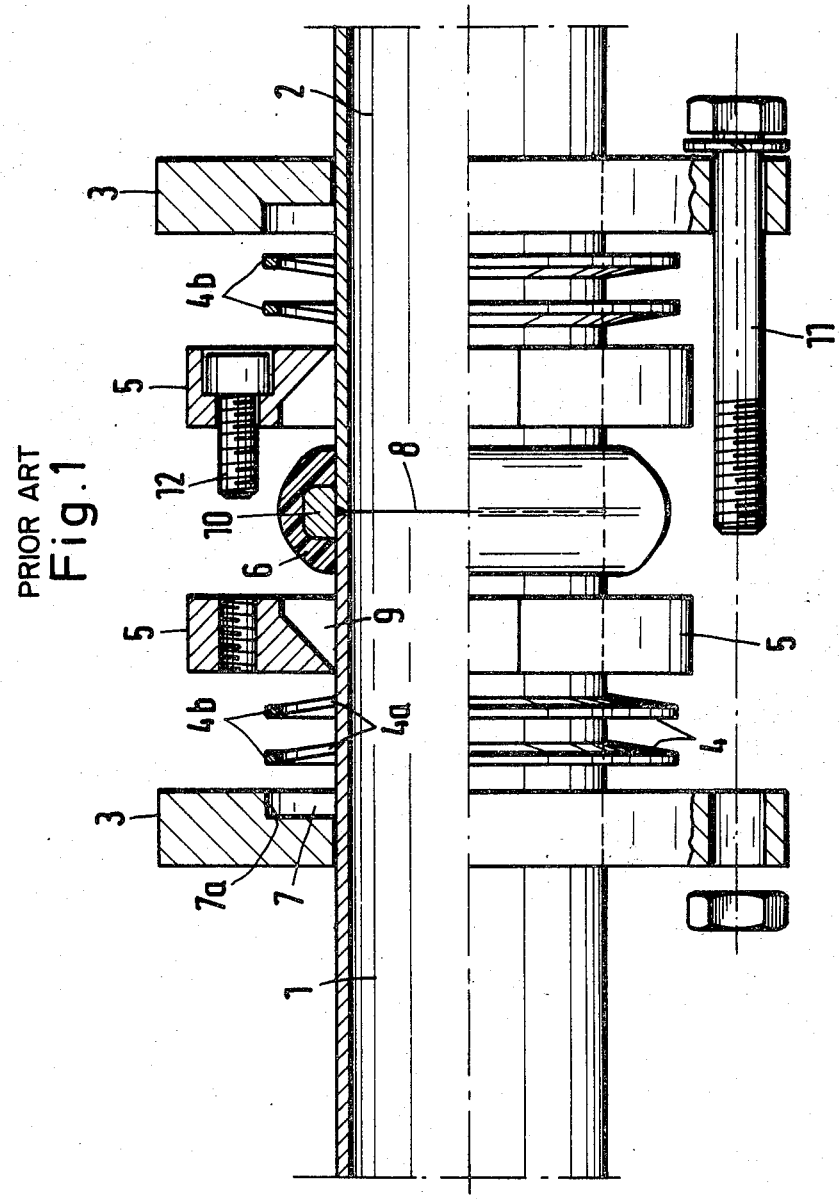
FIG. 1 is a front view, partly in section of a known pipe coupling being mounted.

The pipe coupling shown in FIG. 1 corresponds to European application No. 0 087 702 and serves merely to demonstrate a suitable pipe coupling for which the clamping elements according to the invention are intended.

A pipe coupling according to FIG. 1 is made by initially placing a flange 3, two clamping elements 4, and a chamber part 5 onto each of the aubtting pipe ends 1, 2 to be butt-joined together. A single gasket 6 is then provided for the two pipe ends 1, 2.

The flange 3 has an annular clamping chamber 7 which opens toward the joining butt 8. The two clamping elements 4 are inserted into this clamping chamber 7. The clamping elements comprise convex disks which rest on the pipe ends 1 and 2, respectively, with inner radial clamping edges 4a. The outer clamping edges 4b of the clamping elements are overlapped by an annular clamping surface 7a of the clamping chamber 7. In the released condition, the second clamping element 4 projects past the front surface of the flange 3 associated with it. The configuration of the clamping elements 4 is such that a force pressuring the clamping elements in the axial direction, against the rear side of the associated clamping chamber 7, leads to an increase in the external diameter and, simultaneously, a decrease in the internal diameter of the clamping element.

The chamber part 5 has an approximately triangular external shape and is equipped with a sealing chamber 9 that opens toward the joining butt 8. The sealing chamber is conical in the embodiment shown, i.e., it tapers off in the direction of the adjacent flange 3.

The butt joint 8 is surrounded by the gasket 6 in the form of an elastomeric sealing profile. An inner ring 10 of a hard/and or plastic material, e.g., a metal) is embedded in the gasket. The outer contour of the gasket 6 corresponds approximately to that of the two sealing chambers 9 in the chamber parts 5. The gasket is larger, however, so that pressing the two chamber parts 5 against each other applies an axial and radially inwardly directed pressure to the gasket.

In order to tighten the two flanges 3 against each other, three threaded bolts 11 are provided in uniform distribution around the circumference of the flange in this embodiment. Three hexagon socket screws 12 are arranged for tightening the two chamber parts 5.

In order to install the pipe coupling as shown in FIG. 1, the two chamber parts 5 are screwed together by means of the hexagon socket screws 12 after the gasket 6 has been placed exactly over the butt joint 8. Subsequently, the clamping elements 4 are placed in abutment against the chamber parts 5, and the flange 3 against the clamping elements. By tightening the threaded bolts 11, the flanges 3 are clamped against each other; this effects the above-described deformation of the clamping elements 4. The deformation establishes a frictional and, in case of a sharpened inner clamping edge 4a, also a positive connection between the flange and the ends of the pipes. It is not necessary for the flanges 3 to rest flat against the chamber parts 5 in order for the novel pipe coupling to be functional; it is essential only that the clamping elements 4 be exposed to axial pressure from the chamber parts 5 when the threaded bolts are tightened.

Figure 2:
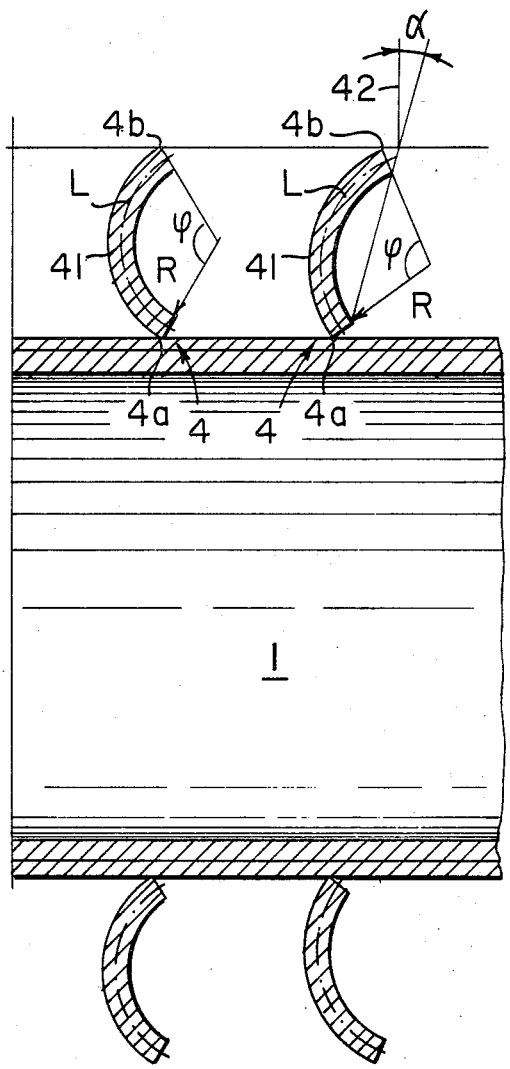
FIG. 2 is a longitudinal section through the upper part of a pipe, upon which different clamping elements have been placed.

FIG. 2 shows a cross section of two different clamping elements slipped onto a pipe end 1. In each case, only the upper part of the cross section is illustrated. Both embodiments show an annular part 41. The cross section of each annular part exhibits an arc-like profile defined by a radius R and forms an annular segment of equal thickness. The segment angle $\phi$ is slightly larger in the left hand clamping element 4 than in the right hand element. The length of the annular part 41 is designated by L. The arc-shaped profile of the right hand clamping element 4 is inclined at an actute angle $\phi$ with respect to the plane 42 of the clamping element 4.

Figure 3:
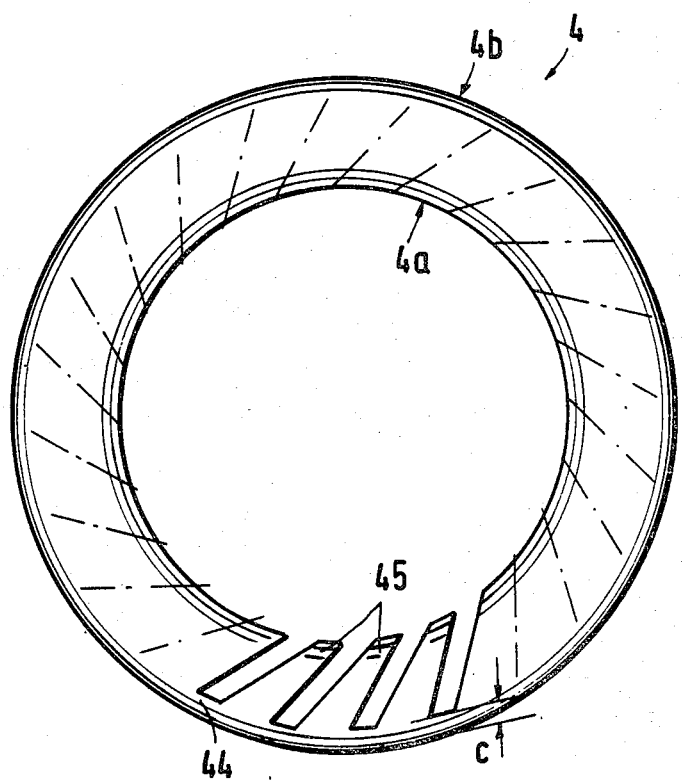
FIG. 3 is a top view of a modified embodiment of clamping element according to the invention.

FIG. 3 shows a modified embodiment of a clamping element, wherein the annular part 41 comprises an outer annulus 44 of constant width "c", and a plurality of tabs 45 which extend radially inwardly from the outer annulus until they are approximately tangent to the internal diameter of the clamping element. The tabs 45 are formed by suitably placed slots and taper off like wedges toward their free ends.

Figure 4:
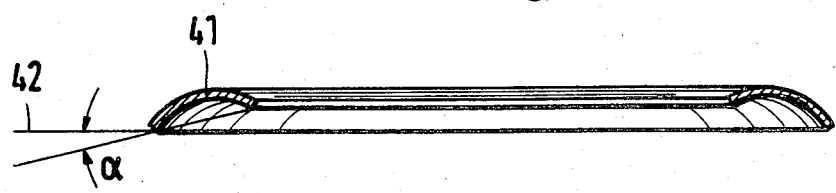
FIG. 4 is a cross section through the clamping element according to FIG. 3.

FIG. 4 shows a cross section through the embodiment according to FIG. 3.

Figure 6:
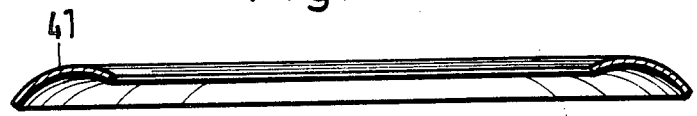
FIG. 6 is a cross section through the clamping element shown in FIG. 5.
Figure 5:
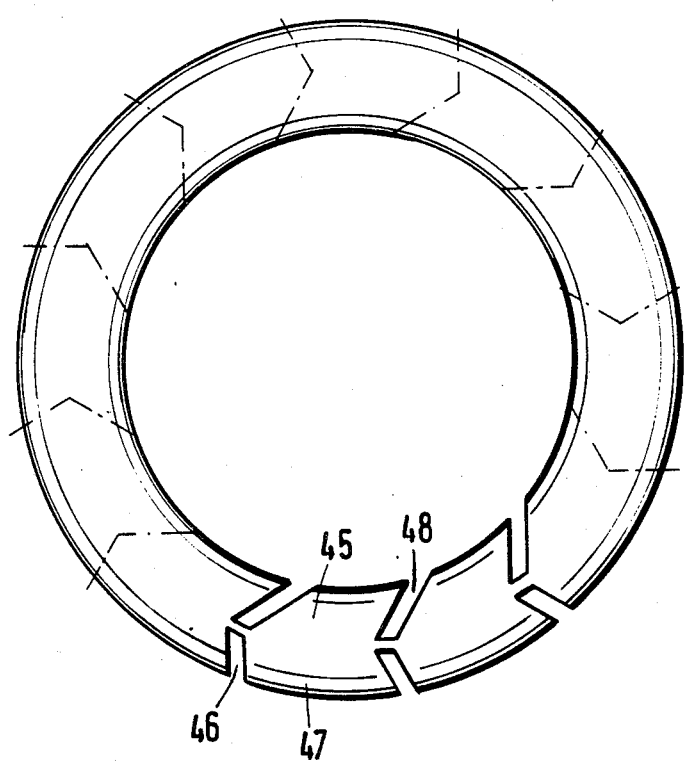
FIG. 5 is a modified embodiment in a view similar to FIG. 3.

In the clamping element shown in FIGS. 5 and 6, the annular part 41 carries a plurality of tabs 47 on its outer circumference, formed by slots 46. These tabs are approximately tangent to the external diameter of the clamping element. In each instance, a radially outer slot 46 converges with a radially inner slot 48 in the manner of an arrow tip. The outer and inner tabs 47, 45 formed in this manner are connected in the peripheral direction only in the area of the arrow tip.

In the clamping element according to FIGS. 7 and 8, the annular part 41 comprises a narrow outer annulus 44, and inwardly-directed radial tabs 49 suspended from the outer annulus. The width "b" of the slots 48 is approximately 1 to 2 mm, and thus about the same as the width "c" of the annulus 44. The clamping element shown here may also be cut at a point 52.

Figure 10:
FIG. 10 is a cross section through a clamping element according to FIG. 9.
Figure 9:
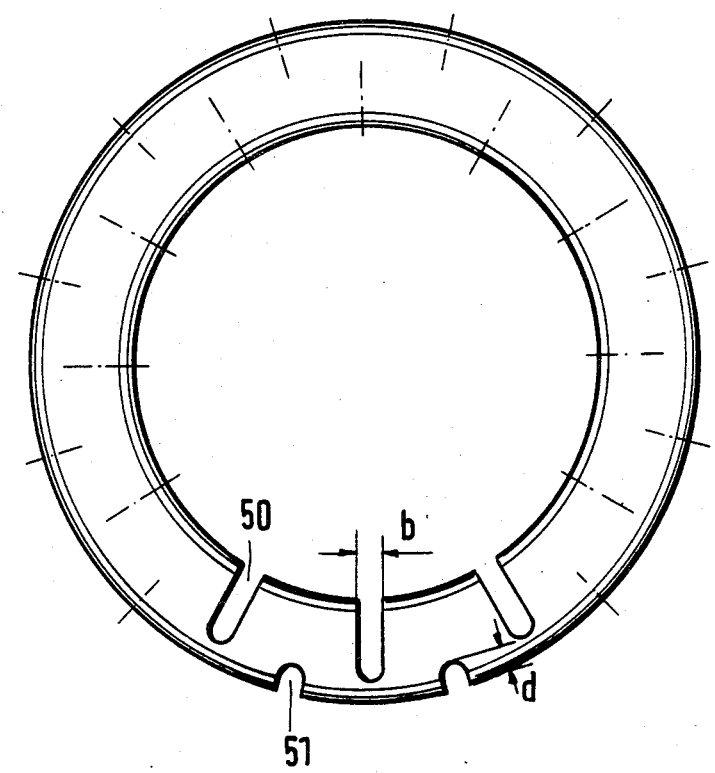
FIG. 9 is a modified embodiment in a view similar to FIG. 7.

In the clamping element shown in FIGS. 9 and 10, the annular part 41 comprises a plurality of radial inner slots 50, and external cutouts 51 arranged between the slots. The length of the radial slots 50 is several times larger than the radial depth "d" of the cutouts 51. The width "b" of the radial slots 50 equals approximately 4 to 6 mm, preferably 5 mm.

What is claimed is:

1. A clamping assembly for a pipe, comprising:
   (a) a flange fitted over a pipe and having a clamping chamber and an annular clamping surface;
   (b) a generally annular-shaped clamping member having a profile in cross-section and fitted over said pipe so as to be extendable into said clamping chamber, said annular member comprising:
      (1) an inner circumference forming an inner radial clamping edge surrounding a substantial portion of the outer circumference of said pipe; and
      (2) an outer circumference forming an outer radial clamping edge overlapped by said annular clamping surface;
      wherein said profile comprises an arc shape, and wherein said annular member is tilted at an acute angle defined by (a) a plane coincident with a right angle crosssection of said pipe, and (b) a line intersecting said inner and outer edges of said annular member; and
   (c) means for applying an axial force to said annular member sufficient to decrease the inner circumference of said annular member into clamping engagement with said outer circumference of said pipe, and sufficient to increase said outer circumference of said annular member overlapped by said clamping surface.

2. A clamping assembly as claimed in claim 1, wherein said arc-shape is defined by a predetermined radius, and wherein said annular member is of equal thickness along said profile.

3. A clamping assembly as claimed in claim 1, wherein said inner radial clamping edge is sharp.

4. A clamping assembly as claimed in claim 1, wherein said annular member comprises a plurality of outer slots through said outer radial edge, and wherein said slots define a plurality of outer tabs.

5. A clamping assembly as claimed in claim 4, wherein said outer tabs comprise free ends which extend to about said outer circumference in a substantially tangential manner.

6. A clamping assembly as claimed in claim 5, further comprising an inner slot corresponding to each outer slot, wherein said inner slots define a plurality of inner tabs, and wherein said inner slots and said outer slots slant so as to form arrow-like patterns pointing in the same circumferential direction, wherein said inner and outer slots are separated by a relatively small part of said annular member disposed at the respective tips of said arrow-like patterns.

7. A clamping assembly as claimed in claim 1, wherein said annular member further comprises a narrow outer annulus, and a plurality of inwardly-directed radial tabs connected to said outer annulus and defined by inner radial slots.

8. A clamping assembly as claimed in claim 7, wherein said slots have a width of about 1-2 mm.

9. A clamping assembly as claimed in claim 7, wherein said outer annulus has a radial width of about 1-2 mm.

10. A clamping assembly as claimed in claim 1, wherein said annular member comprises a plurality of inner radial slots through said inner radial clamping edge and a plurality of outer radial cut-outs through said outer radial edge, wherein the outer cut-outs are arranged between the inner slots.

11. A clamping assembly as claimed in claim 10, wherein said inner slots have a radial dimension several times larger than a radial dimension of said cut-outs.

12. A clamping assembly as claimed in claim 10, wherein said radial slots have a width of about 5 mm.

13. A clamping assembly as claimed in claim 1, wherein said annular member comprises a circumferential discontinuity to produce a gap therein.

14. A clamping assembly as claimed in claim 1, wherein said acute angle is no greater than about 15°.

15. A clamping assembly as claimed in claim 1, where said annular member includes a plurality of inwardly-directed tabs having free ends near said inner circumference.

16. A clamping assembly as claimed in claim 30, wherein said annular member includes an outer annulus having a constant radial width, and a plurality of tabs extending inward from said annulus parallel to each other and at an acute angle with respect to a radius of said member.

17. A clamping element as claimed in claim 16, wherein said tabs are tapered.

18. A clamping assembly as claimed in claim 15, wherein said annular member comprises an outer annulus having a constant radial width, and wherein said plurality of inwardly-directed tabs are attached to the outer annulus and extend from the outer annulus to about said inner circumference in a substantially tangential manner.

19. A clamping assembly as claimed in claim 18, wherein said tabs taper toward their respective free ends.

20. A clamping assembly as claimed in claim 30, wherein said annular member includes an annulus having a constant width, and a plurality of inward and outward tabs, said inward tabs extending parallel to each other and inward from said annulus at an acute angle to a radius of said annulus, said outward tabs extending parallel to each other and outward from said annulus at an acute angle to said radius of said annulus, each of said outward tabs registering with a respective inward tab to form an arrow shape.

21. A clamping assembly as claimed in claim 20, wherein each of said inward and outward tabs is separated respectively from adjacent inward and outward tabs by means of slots.

22. A clamping assembly as claimed in claim 1, wherein said clamping assembly includes two said flanges and two said annular-shaped clamping members, a first said flange and annular member fitted over a first pipe adjacent an end thereof, and a second said flange and annular member fitted over a second pipe adjacent an end thereof, said ends being in abutting engagement and covered with a gasket member.

23. A clamping assembly as claimed in claim 22, wherein said first and second flanges are loosely slipped over said first and second pipes respectively.

24. A clamping assembly as claimed in claim 22, wherein said pipe ends are plastic.

25. A clamping assembly as claimed in claim 24, wherein said pipe ends comprise polyvinyl chloride.

* * * * *